United States Patent [19]

Kazaoka et al.

[11] 4,370,000
[45] Jan. 25, 1983

[54] SEAT FOR MOTOR VEHICLES

[75] Inventors: Kenichi Kazaoka, Nagoya; Takemi Hattori, Kariya, both of Japan

[73] Assignee: Aisin Seiki Kabushiki Kaisha, Japan

[21] Appl. No.: 178,027

[22] Filed: Aug. 14, 1980

[30] Foreign Application Priority Data

Aug. 22, 1979 [JP] Japan ............................. 54-106832

[51] Int. Cl.³ ............................................. A47C 3/00
[52] U.S. Cl. .................................. 297/284; 297/466
[58] Field of Search ............... 297/284, 466, 486, 484, 297/116

[56] References Cited

U.S. PATENT DOCUMENTS 979,049  12/1910  Thomson ........................... 297/116

FOREIGN PATENT DOCUMENTS 2721539  11/1978  Fed. Rep. of Germany ...... 297/284

Primary Examiner—Francis K. Zugel
Attorney, Agent, or Firm—Finnegan, Henderson, Farabow, Garrett & Dunner

[57] ABSTRACT

A seat for motor vehicles includes a pair of adjustable lateral edges on at least one of the seat cushions and backrest cushions to impart lateral restraint suitable to the occupant, the lateral edges being pivotally mounted on stationary brackets and mechanically connected to each other by a connecting link. One of the lateral edges includes a pawl engageable with one of the teeth provided on one stationary bracket and releasable therefrom upon rotation of one lateral edge in one direction. The rotation of the other lateral edge in the opposite direction causes the selective engagement of the pawl as well as the opposite rotation of one lateral edge, thereby performing the lateral restraint of the seat without any lever or knob projecting out of the seat.

11 Claims, 5 Drawing Figures

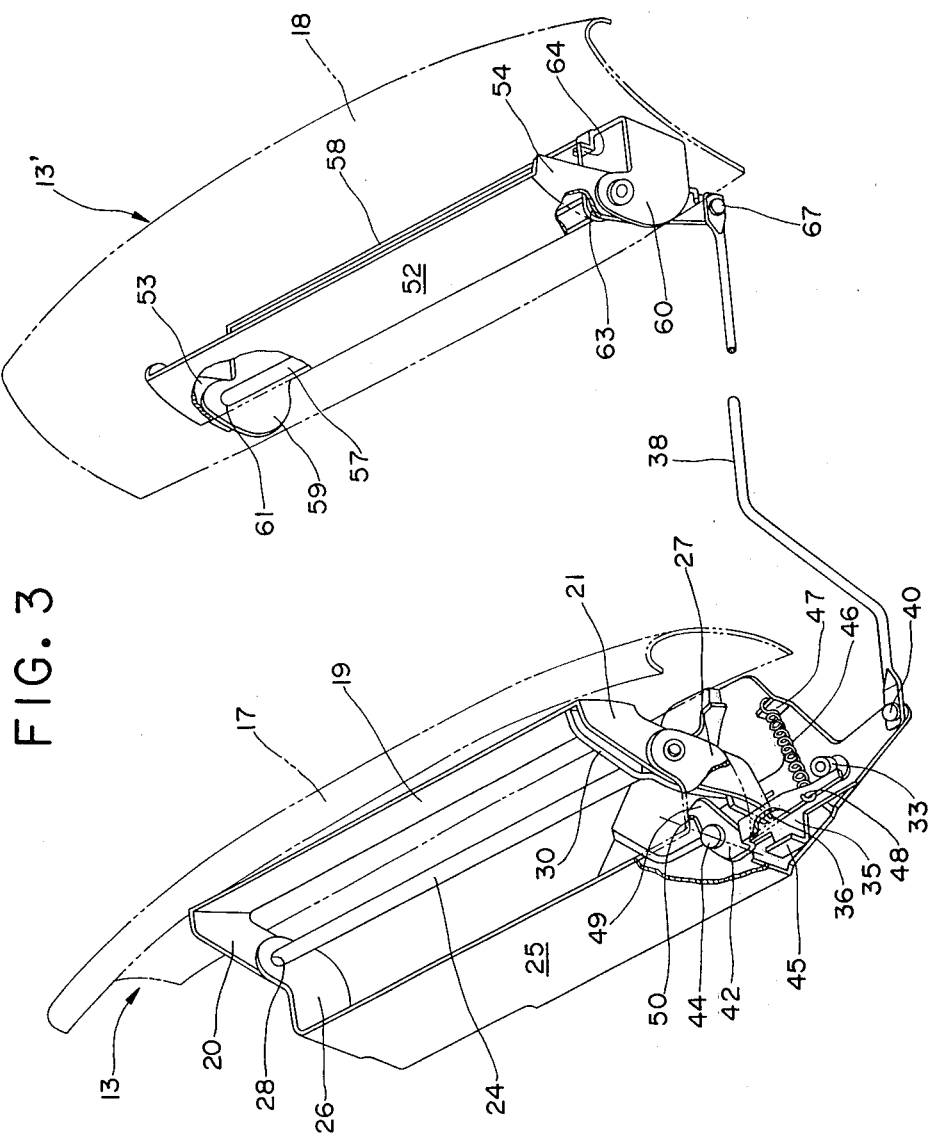

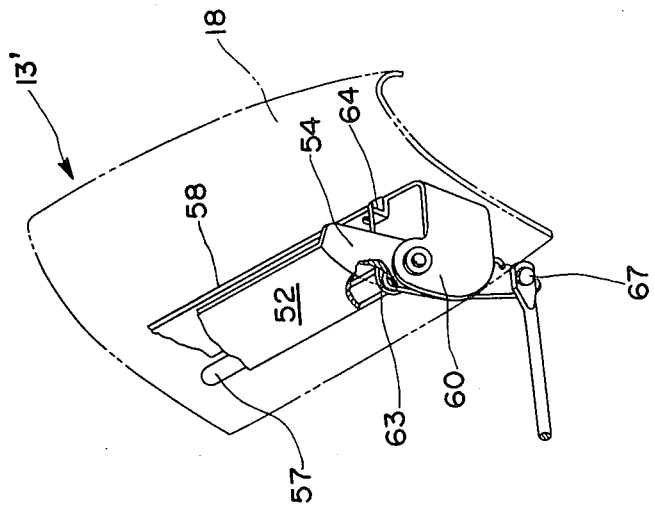
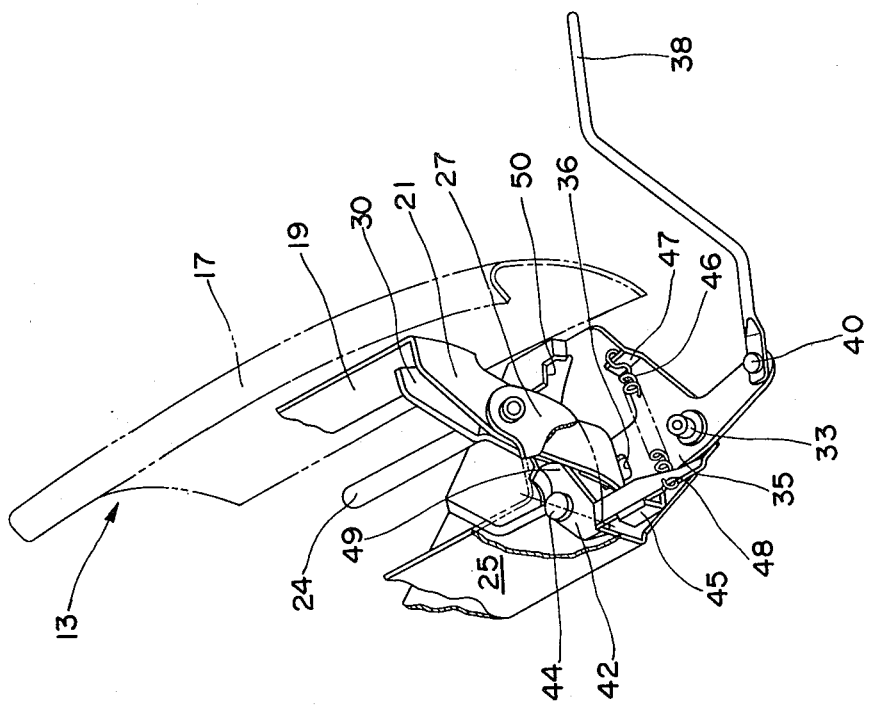

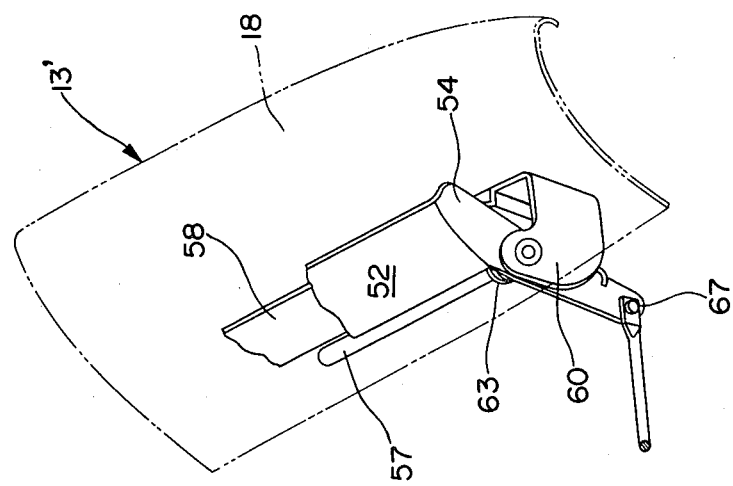
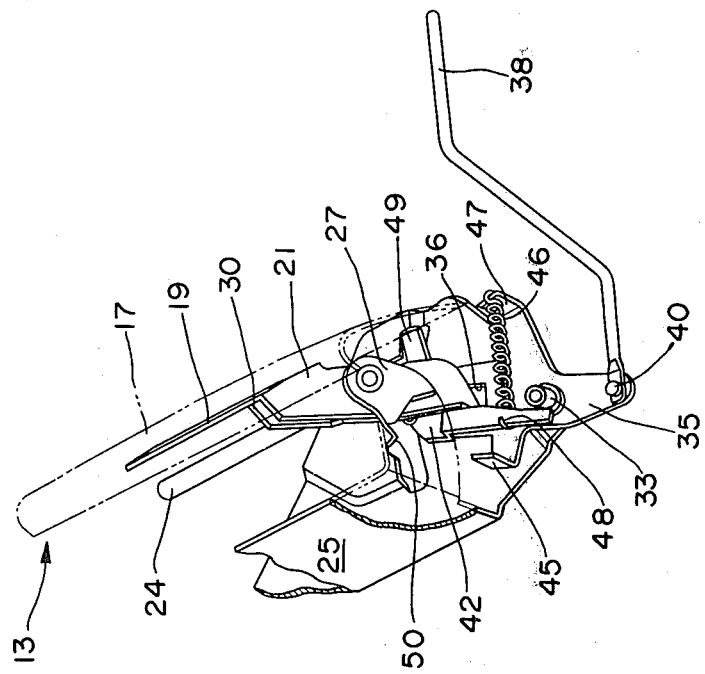
FIG. 5

SEAT FOR MOTOR VEHICLES

BACKGROUND OF THE INVENTION

This invention relates to seats for motor vehicles, more particularly to a seat whose seat cushion or backrest cushion has adjustable lateral edges raised over at least a part of the length of the cushion.

It is a recent tendency to employ the so-called "bucket seats" in which the lateral edges of the seat cushion and/or backrest cushion are adjustable to impart suitable restraint to the driver or passenger particularly in the sports-type motor vehicles.

According to the conventional practice, it is necessary to provide levers or knobs to realize the adjustment of the lateral edges of the seat cushion and/or backrest cushion. Such levers or knobs are usually disposed at the outer side walls of the seat adjacent to the vehicle door so that it is difficult to manipulate the levers or knobs in a limited and invisible space therearound, and other levers for adjustment of seat reclining or the like may accidentally malfunction.

SUMMARY OF THE INVENTION

It is, accordingly, one of the objects of the present invention to provide a seat for motor vehicles which will obviate the conventional drawbacks.

It is another object of the present invention to provide a seat for motor vehicles which may be adjusted to impart lateral restraint suitable to the driver or passenger without any levers or knobs.

It is a further object of the invention to provide a seat for motor vehicles which is free from any malfunction and is reliable in operation to obtain desirable adjustment.

A seat according to the invention includes a seat cushion and a back cushion, one of the seat cushions comprising a pair of lateral edges. One of the lateral edges is pivoted to a first stationary bracket that is provided with a plurality of teeth. The one lateral edge is provided with a pawl that is engageable with one of the teeth. The other lateral edge is pivotally mounted opposite the first lateral edge on a side stationary bracket and is operationally connected to the pawl of the first lateral edge by a connecting link. The pivotal rotation of first lateral edge causes the release of the pawl from one of the teeth. The pivotal rotation of the other lateral edge causes the selective engagement of the pawl as well as the opposite rotation of the first lateral edge through the connecting link.

BRIEF DESCRIPTION OF THE DRAWINGS

FIG. 3 is a perspective view of the seat of FIG. 2 in the assembled state and showing the maximum restraint position thereof;

FIG. 4 is a view similar to FIG. 3, but showing the released condition of the seat; and FIG. 5 is a view similar to FIG. 3, but showing the neutral condition of the seat.

DETAILED DESCRIPTION OF THE PREFERRED EMBODIMENT

Figure 1:
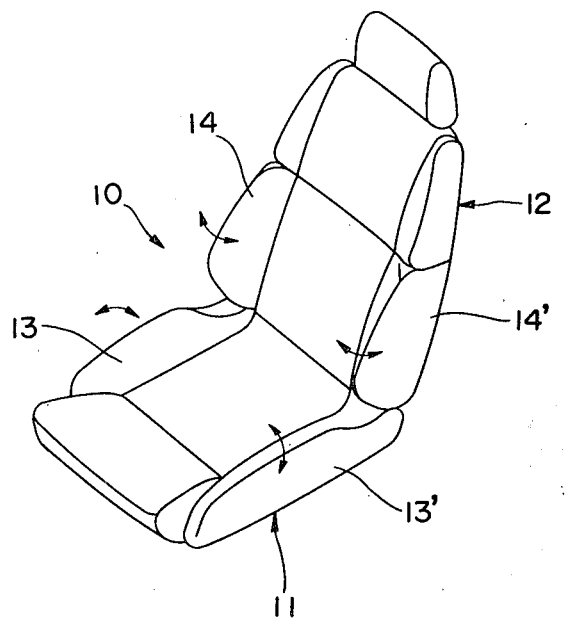
FIG. 1 is an exterior perspective view of the seat in accordance with the present invention.

Reference is now made to FIG. 1 wherein there is shown a seat structure 10 comprising a seat cushion 11 provided with adjustable lateral edges 13,13' and a back cushion 12 similarly provided with adjustable lateral edges 14,14.

Figure 2:
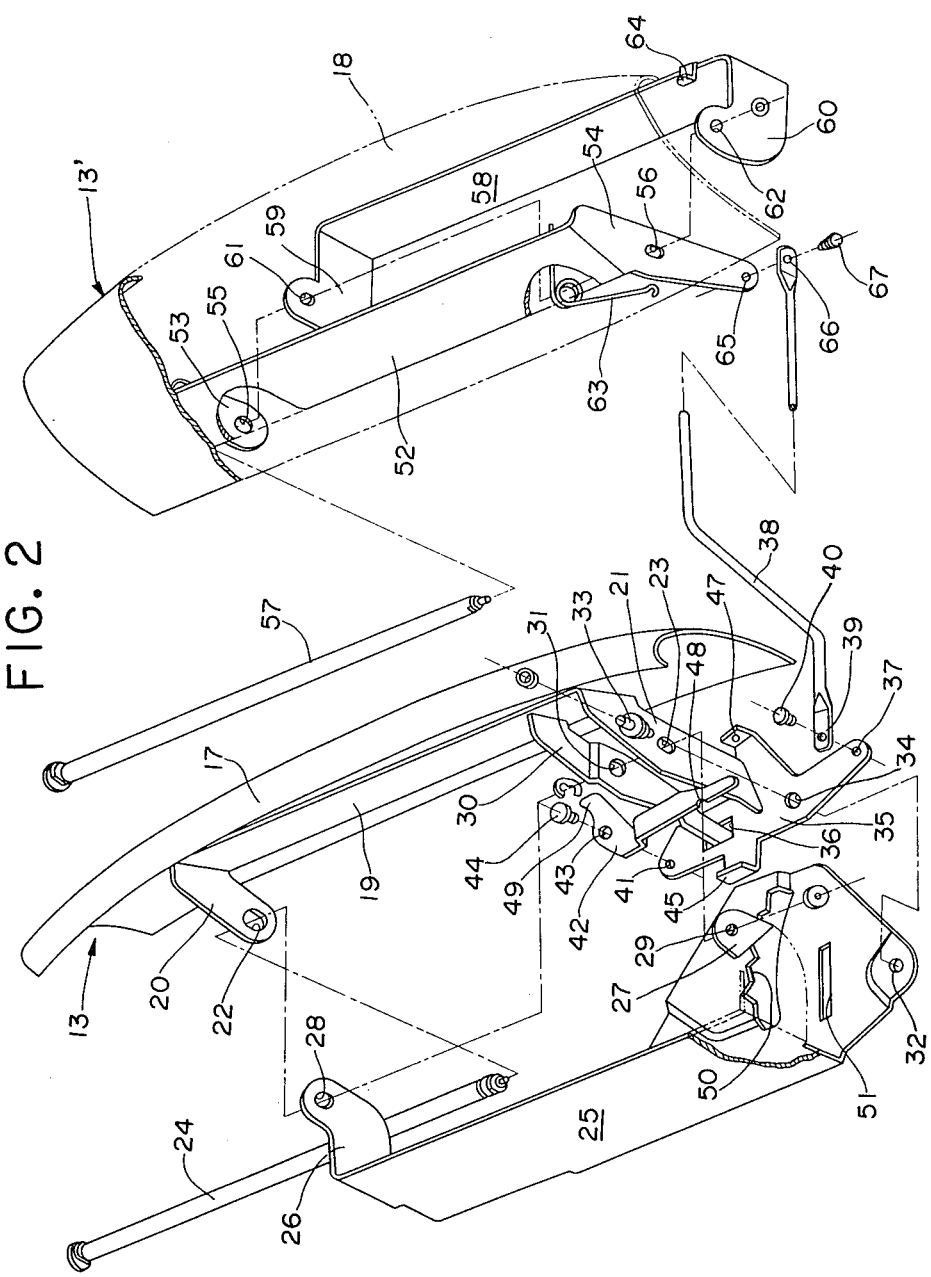
FIG. 2 is an exploded view of the principal parts of the seat of FIG. 1.

In FIGS. 2 and 3, the lateral edge 13 of the seat cushion 11 includes a metallic plate 17 while the lateral edge 13' thereof includes a metallic plate 18 to be manually operated by the occupant.

The plate 17 is reinforced at the rear side thereof by a plate 19 fixed thereto and formed with a pair of side flanges 20,21 extending downward. The side flanges 20,21 are provided with holes 22,23, respectively, to a pass a shaft 24 therein in such a manner that the shaft 24 may be rotated in unison with the reinforcing plate 19.

A one-side support bracket 25 is secured to the seat frame, not shown, of the lateral edge 13 and formed with a pair of flanges 26,27 which are provided with holes 28,29, respectively. The shaft 24 also passes through the holes 28,29 to be rotated with respect thereto.

An operational lever 30 rotatably mounted at a hole 31 thereof, on the shaft 24 may be brought into abutment with the reinforcing plate 19 at one end thereof and is disposed at the other end thereof in a hole 36 of a support link 35 which in turn is pivotally mounted on the support bracket 25 through a pin 33 passing a center hole 32 thereof. The support link 35 is pivotally carried on one end of a link 38 connected to the support link 35 of lateral edge 13', by means of a pin 40 passing through edge hole 37 of the support link 35 and an edge hole 39 of the connecting link 38 so that the movement of the connecting link 38 may rotate the support link 35 about the pin 33.

A generally L-shaped pawl lever 42 is pivotally mounted on the support link 35 by a pin 44 passing through a hole 43 thereof and the other edge hole 41 of the support link 35. The clockwise rotation of the pawl lever 42 is limited to some extent by an upright flange 45 of the support link 35 which is also provided with another upright flange 47. The clockwise rotation of the operational lever 30 around the shaft 24 is limited by an elongated slot 51 of the support bracket 25.

Between the upright flange 47 of the support link 35 and a notch 48 on the pawl lever 42 is interposed a retracting spring 46 to urge the pawl lever 42 to rotate about the pin 44 in the counter-clockwise direction so that a pawl 49 formed at the end thereof may be continuously brought into engagement with one of the teeth 50 provided on the support bracket 25 at the plane parallel to the pawl lever 42. The pawl lever 42 is engageable with the flange 21 of the reinforcing plate 19 so that pawl member 42 is rotated around the pin 44 upon manipulation of the lateral edge 13.

A reinforcing plate 52 provided with downward flanges 53,54 is fixed to the rear side of the plate 18 for the lateral edge 13'. The plate 18 is movable in unison with the reinforcing plate 52 which is provided at the flanges 53,54 with holes 55,56, respectively, to pass a shaft 57 therein in the rotationally limited direction.

A support bracket 58 secured to the seat frame, not shown, of the lateral edge 13' is provided with flanges 59,60 having holes 61,62, respectively, to pass the shaft 57 therein in the rotational direction.

A spring 63 engages at one end thereof with an edge 64 of the support bracket 58 and at the other end thereof with the side wall of the flange 54 of the reinforcing plate 52 to thereby urge the reinforcing plate 52 to rotate in the clockwise direction.

The connecting link 38 is positioned at a hole 66 thereof pivotally mounted on the flange 54 of the reinforcing plate 52 by a pin 67 which also passes through a hole 65 of the flange 54.

In operation, when the maximum restraint to the occupant, (the lateral edges 13,13' at the most inward positions as shown in FIG. 3), is to be released to arrive at the neutral position of the pawl 49, the lateral edge 13 is rotated in the clockwise direction about the shaft 24 in unison with the plates 17 and 19. The rotation of the reinforcing plate 19 causes the pawl lever 42 to be rotated in the clockwise direction about the pin 44 to thereby release the pawl 49 from one of the teeth 50 of the support bracket 25 the release position being shown in FIG. 4. Then, the release of the first lateral edge 13 allows the other lateral edge 13' to be rotated in the clockwise direction due to the exerting force of the spring 63 which continuously urges the reinforcing plate 52 to rotate in the clockwise direction about the shaft 57. Thus, the connecting link 38 is moved to the left to thereby rotate the support link 35 in the clockwise direction about the pin 33 until the pawl link 42, mounted on the support link 35 brings the pawl 49 to the neutral position, as illustrated in FIG. 5.

When the restraint adjustment is to be performed from the neutral position of FIG. 5, the lateral edge 13 is at first rotated in the clockwise direction to release the pawl 49 from one of the teeth 50 as explained above. Then, the other lateral edge 13' is rotated in the counter-clockwise direction about the shaft 57 to move the connecting link 38 in the right direction. Therefore, the support link 35 is rotated in the counter-clockwise direction about the pin 33 to thereby rotate the operational lever 30 in the clockwise direction due to engagement of the other end of the operational lever 30 with the hole 36 of the support link 35, with the result that the one end of the operational lever 30 urges the lateral edge 13 to rotate in the clockwise direction about the shaft 24. The release of the counter-clockwise rotation of the lateral edge 13' will limit the right movement of the connecting link 38 as well as the clockwise rotation of the lateral edge 13, to thereby provide suitable restraint. Such suitable restraint position is maintained by the locking engagement of the pawl 49 with one of the teeth 50 due to the exerting force of the spring 46 acting on the pawl 49.

Having described an illustrative embodiment of the invention, it is to be understood that other embodiments will occur to those skilled in the art and that their modifications are to be construed as part of this invention.

What is claimed is:

1. A seat with lateral edges capable of selective adjustment without the use of any exterior levers or knobs comprising:
   means for pivotably mounting the first lateral edge on the frame of the seat,
   means for pivotably mounting the second lateral edge on the frame of the seat opposite said first lateral edge,
   an operational lever pivotably connected to said frame for engaging said first lateral edge and limiting the outward movement of said first lateral edge,
   linkage means, interconnecting said second lateral edge and said operational lever, for causing said operational lever to pivot inwardly and outwardly in concert with said second lateral edge,
   releasable lock means for locking the linkage means in selected fixed positions to thereby fix the second lateral edge and operational lever and thus limit the outward pivoting of said first lateral edge, and
   means for releasing said releasable lock means when the first lateral edge is pivoted inwardly away from said operational lever,
   whereby the inward rotation of said first lateral edge will enable the user of the seat to adjust the position of the lateral edges as desired.

2. The seat of claim 1 wherein said releasable lock means includes a plurality of teeth formed in the frame of said seat and a pawl member for selective engagement with one of said teeth.

3. The seat of claim 2 wherein said means for releasing said lock means includes an extension of said first lateral edge which upon the inward rotation of the first lateral edge engages a portion of said pawl member and pivots the pawl member sufficiently to disengage the pawl member from said teeth.

4. The seat of claim 1 wherein said linkage means includes:
   a support link pivotably connected to the frame of said seat, said support link at one end engaging said operational lever so that the operational lever pivots upon the pivoting of said support link, and
   a linkage bar connected at one end to said support link and at its opposite end to said second lateral edge.

5. The seat of claim 4 wherein said releasable lock means includes a plurality of teeth formed in the frame of said seat and a pawl member pivotably fixed to said support link for selective engagement with one of said teeth.

6. The seat of claim 5 wherein said means for releasing said lock means includes an extension of said first lateral edge which upon the inward rotation of the first lateral edge engages a portion of said pawl member and pivots the pawl member sufficiently to disengage the pawl member from said teeth.

7. The seat of claim 6 further comprising resilient means to bias the pawl member toward engagement with said teeth.

8. The seat of claim 14 further comprising resilient means to urge said second lateral edge to pivot outwardly.

9. The seat of claim 8 wherein said support link includes a hole which receives and houses an end of said operational lever.

10. The device of claim 9 further comprising an elongated slot, formed in the frame of said seat and aligned with the hole in said support link, to limit the rotational movement of said operational lever.

11. The seat of claim 10 further comprising an upright flange formed on said support link to limit the pivotal movement of said pawl member.

* * * * *